Dec. 14, 1926.
E. MALLERY
PROCESS OF PRODUCING STRUCTURES
Filed Nov. 14, 1923    4 Sheets-Sheet 2
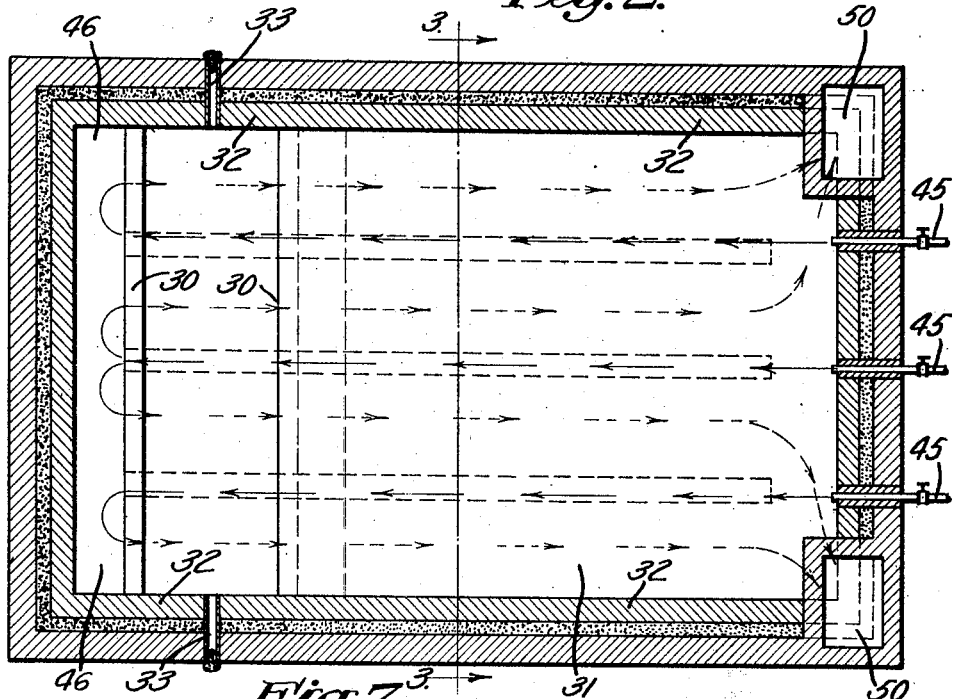
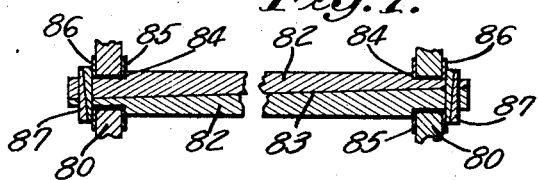
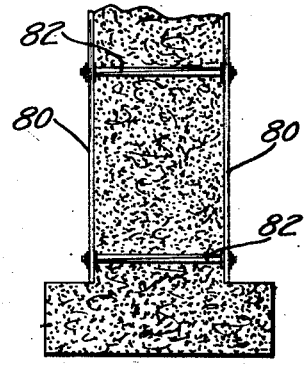
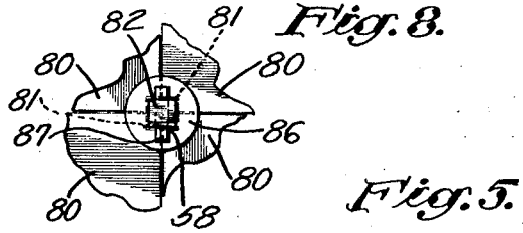
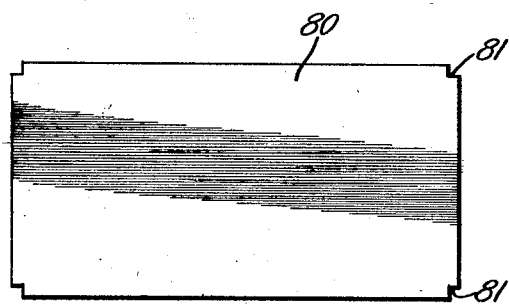
INVENTOR
ELLIS MALLERY
BY
ATTORNEYS Dec. 14, 1926.
E. MALLERY
PROCESS OF PRODUCING STRUCTURES
Filed Nov. 14, 1923    4 Sheets-Sheet 3
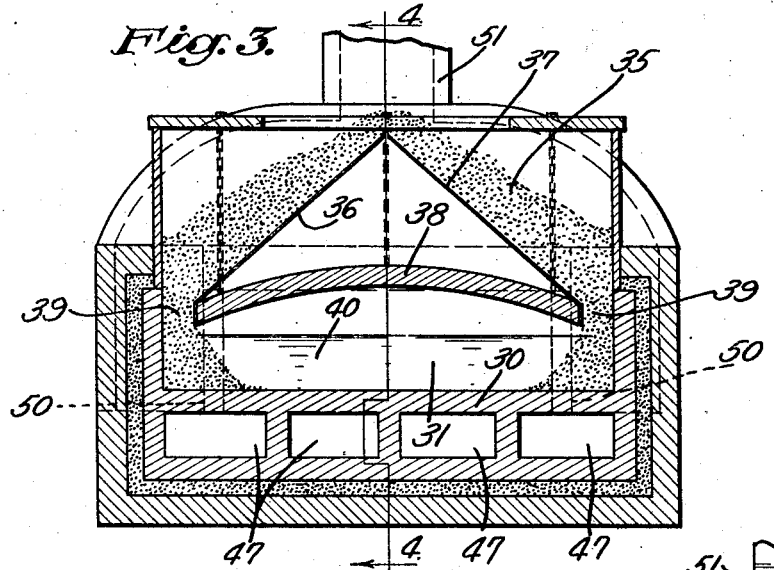
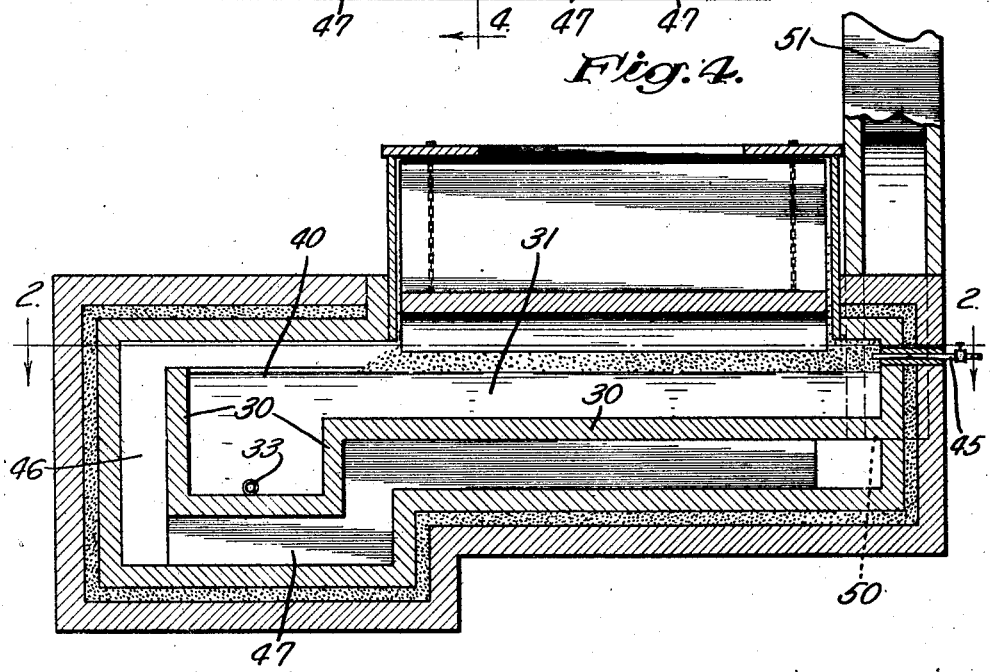
INVENTOR
ELLIS MALLERY
By
Graham + Lewis
ATTORNEYS Dec. 14, 1926.
E. MALLERY
PROCESS OF PRODUCING STRUCTURES
Filed Nov. 14, 1923      4 Sheets-Sheet 4
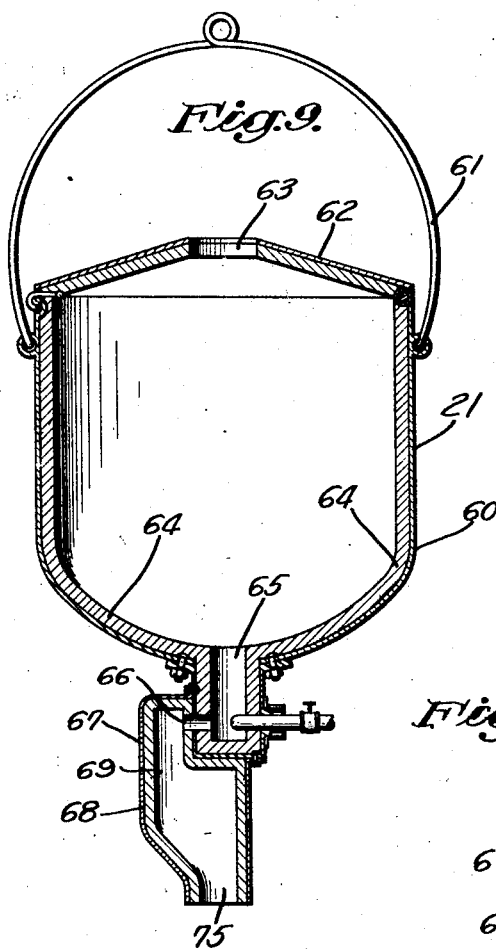
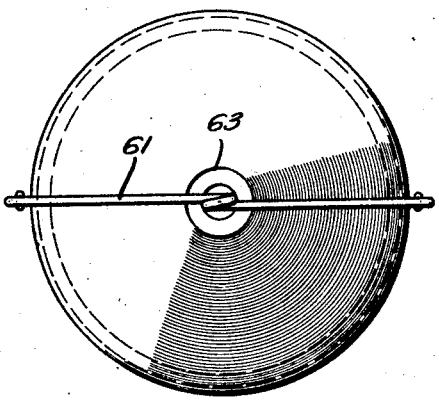
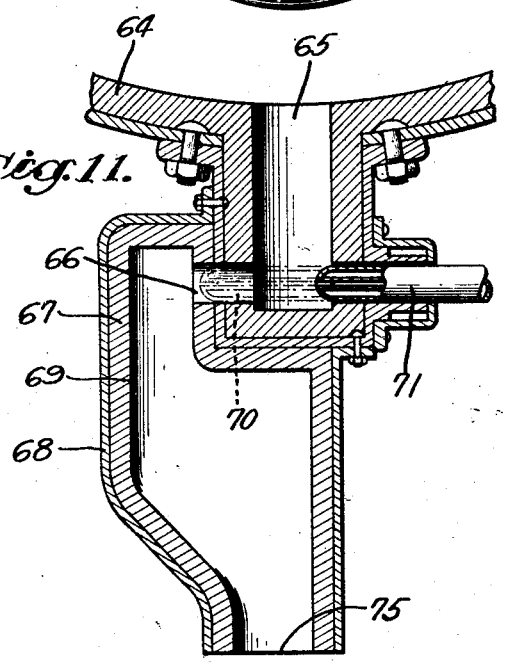
INVENTOR
ELLIS MALLERY
By
Graham + Davis
ATTORNEYS Patented Dec. 14, 1926.

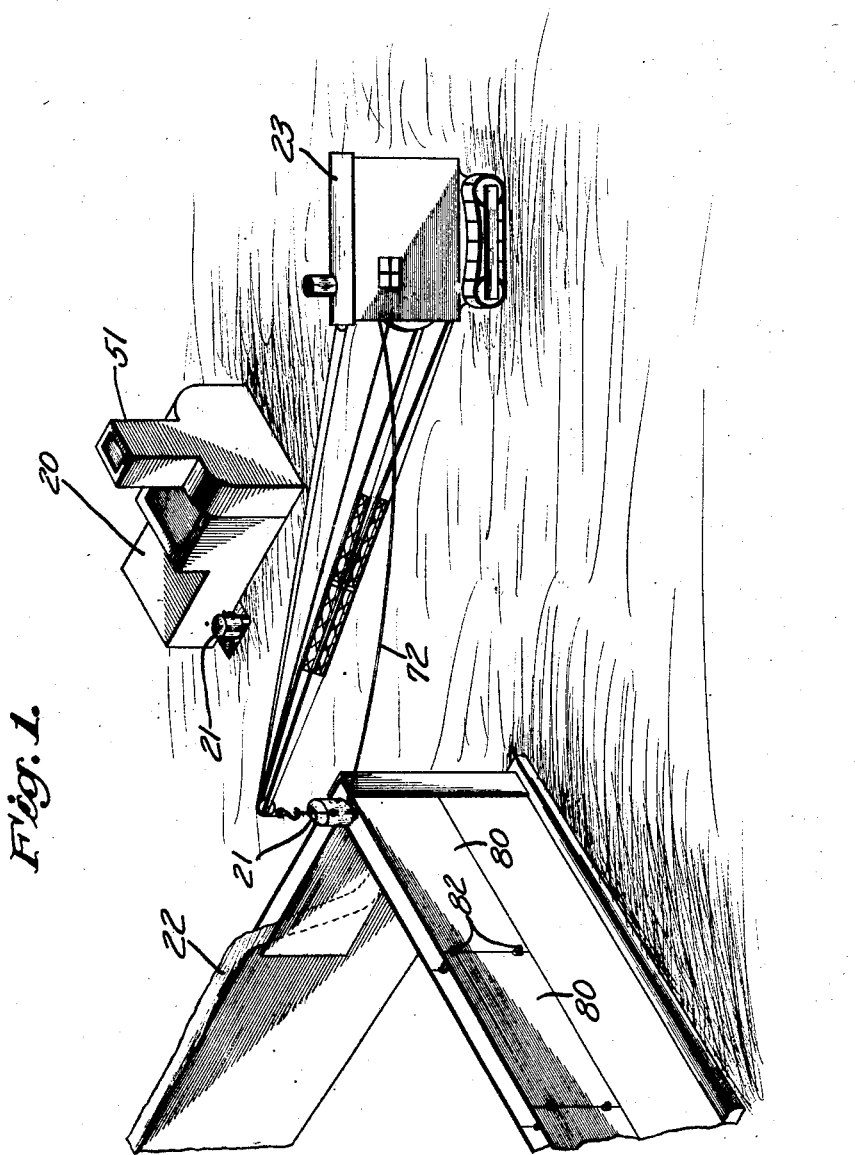

1,610,460

UNITED STATES PATENT OFFICE.

ELLIS MALLERY, OF LOS ANGELES, CALIFORNIA.

PROCESS OF PRODUCING STRUCTURES.

Application filed November 14, 1923. Serial No. 674,786.

My invention relates broadly to production of structures, such as roads, bridges, buildings and other structures which are now made from various structural materials. It is an object of my invention to produce such structures by melting suitable material and pouring same into the ultimate desired position.

The material as used herein is intended to include metallic or non-metallic substances and their derivatives, a desirable combination being sand, gravel or crushed rock mixed with a flux such as sodium carbonate, and which after being melted is poured into position in the structure, forms being employed in some cases to confine the molten material until cooled.

It is a further object of my invention to cause a multiplicity of open spaces in the material so that when cooled it will be vesicular in its nature, that is, contain a large number of small cavities which tend to lighten the structural material, minimize expansion and contraction and reduce conductivity, the matter being particularly important when used in walls.

A further object of my invention is to provide means by which structures of all kinds can be built of such vesicular material at a minimum of expense and with great speed.

My invention is adapted to produce almost every variety of structure now made of stone, brick or concrete, as well as to produce many structures now made of wood, steel, and other materials.

It is, for example, well adapted to the construction of roads, in which case a thick layer of highly vesicular material is first laid down, this layer being then surfaced with denser and less vesicular material. It is also adapted to the production of dams, retaining walls and reservoirs.

My invention is, however, particularly well adapted to the production of what are generally termed framed structures, namely, buildings, bridges and the like, and, for the purpose of fully describing the manner and process of constructing, compounding and using my invention in such full, clear, concise and exact terms as to enable any person skilled in the art of construction to use the same, I will use as an example the construction of a building. It is understood, however, that this application of the invention is only one of many, all of which come within the scope of the annexed claims.

Further objects and advantages will be made evident hereinafter.

Referring to the drawings which are for illustrative purposes only,

Fig. 1 is a perspective view showing a portion of a building in the course of construction, utilizing means for carrying on my process.

Fig. 2 is a horizontal sectional view taken on a plane indicated by the line 2—2 of Fig. 4.

Fig. 3 is a section on a plane represented by the line 3—3 of Fig. 2.

Fig. 4 is a section on a plane represented by the line 4—4 of Fig. 2.

Fig. 5 is a side view of a metal plate used in practising my invention.

Fig. 6 is a section through a portion of a wall showing the method of attaching the metal plates shown in Fig. 5.

Fig. 7 is a form tie used in practising my invention.

Fig. 8 is an elevation showing how a single form tie is utilized to hold the corners of four of the plates shown in Fig. 5.

Fig. 9 is a section through a pouring pot.

Fig. 10 is a plan view of same; and

Fig. 11 is a section through the frothing mechanism.

In the method shown in the drawings I employ a furnace 20 in which I melt the desired mineral material, which will usually be some sort of sand or gravel mixed with a suitable flux. Sodium sulphate forms a cheap and desirable flux for this purpose. The material, after being melted in the furnace 20, is delivered to a pouring pot 21, from which it is carried to and dumped into a wall 22 by any suitable conveying means, such as a locomotive crane 23. The material is reduced to a froth at the time it is dumped from the pouring pot 21 by means which will hereinafter be explained.

Any form of furnace suitable for melting material such as sand or gravel may be employed in the practice of my invention. In Figs. 2, 3 and 4 I illustrate a convenient form of furnace for this purpose. In the form of furnace shown I provide walls 30 forming a melting receptacle 31, this receptacle being of elongated form and having a wall 32 communicating on either side with tapping openings 33 which can be conveniently closed when not in use by a stopper of wet fire clay, this clay immediately hardening and forming a solid plug to retain the molten material. The sand 35, properly mixed with flux, is delivered onto the inclined sheet metal pot 36 having a cover 37 and having an arched bottom 38 preferably formed of fire brick. The raw material flows downwardly through openings 39 on either side of the cover 37 and is delivered into the bath of molten material 40 carried in the chamber 31. Oil or gas burners 45 project through the wall of the furnace and deliver an intense flame to the space under the fire brick arch 38 and above the molten material 40, these flames passing from right to left as shown in Fig. 4, and passing downwardly through vertical flues 46 into horizontal flues 47 which extend under the wall 30 and communicate with twin openings 50, which in turn communicate with a stack 51. By using this form of furnaces I am able to reduce various types of mineral material to a molten condition, in which form they may be withdrawn from the furnace and delivered to one of the pouring pots 21 illustrated in Figs. 9, 10 and 11. This pouring pot consists of a metal container 60 having a bail 61 and a cover 62 with a central opening 63 therein. The interior of the pouring pot is lined with heat resisting material 64, such as fire brick. An opening 65 in the bottom of the pouring pot extends down and communicates with and through an opening 66 lined with fire brick 69. A water-cooled nozzle 71 projects into the opening 66.

Whenever the molten material is delivered to the point at which it is desired to form the structure, the nozzle 71 is pulled to the right as shown at Figs. 9 and 11, thus clearing the opening 66. The molten material then starts to flow into this chamber, being forced through the opening 66 by a blast of air, gas, spray or other material from the nozzle 71. This material is conveniently delivered to the pouring pot 21 by a flexible hose 72, leading back to a suitable compressor or storage tank in the cab of the crane 23. The air, gas or spray blowing through the orifice 66 in direct contact with the molten material which is flowing therethrough agitates and combines with this material and forms a froth which further mixes and homogenizes in the chamber 67, the material passing through the opening 75 in the bottom of the chamber in the form of a molten froth. This froth, when it solidifies, forms a vesicular mass which is extremely light and which has certain other advantages to be hereinafter mentioned.

This molten mass may be used to form all sorts of structures. I have shown it applied to the formation of a wall, in which case I preferably use flat plates 80 having square notches 81 in the corners thereof. These plates are supported as shown at 58 at their corners by form ties which consist of members 82 having a rectangular section and having inclined sides 83 which give them a wedge-shaped form. The members 82 form complementary wedges having shoulders 84, against which a washer 85 may be secured. The second washer 86 is secured by wedges 87 driven through members 82, the plates 80 being secured between the washers 85 and 86. It is possible, using the members 82, to secure the plates in the relationship shown in Figs. 1 and 6, these plates forming a channel into which the vesicular mass can be dumped. After the mass hardens it is possible, by removing the wedges 87 and striking a sharp blow on each of the wedges 82, to remove the wedges 82 and the metal plates 80 from the wall, square openings being left, however, where the members 82 come out. These square openings may be utilized for bolting to the wall or may be plugged with wood or cement.

While I have shown and described my invention applied to the building of a wall, it is to be understood that it can be applied, as already explained, to many other purposes. By blowing air, gas or spray into the molten material, I am able to produce a froth which, when it cools, is full of small openings so that the resulting material is extremely light. This material, due to the large proportion of voids therein, is a poor conductor of heat. It is possible, due to the large proportion of voids in the material, to drive nails or spikes directly into it without causing cracks therein. The material is also largely proof against impact which would shatter a solid material. Shock is absorbed by limited crushing at point of impact and a minimum of damage is sustained.

Structures built of this material will be different from other poured structures in that the make-up will be cellular as well as monolithic. Structures thus made will also represent a departure in the matter of method and product, such as typified in concrete where a minimum of voids is the desired result. In this case a maximum of voids is the object sought.

I claim as my invention:

1. A process of producing a structure which comprises: melting a solidified substance; withdrawing the molten substance from its receptacle by atomization to produce a molten foam; and flowing said foam into place and allowing it to solidify in the absence of applied pressure to produce a hardened foam.

2. A process of producing a structure which comprises: melting a solidified substance with a flux; discharging the molten material from its receptacle and simultaneously treating it to produce a molten foam; and flowing said foam into place and allowing it to solidify in the absence of applied pressure to produce a hardened foam.

In testimony whereof, I have hereunto set my hand at Los Angeles, California, this 8th day of November, 1923.

ELLIS MALLERY.